US012105058B2

(12) United States Patent
Xue et al.

(10) Patent No.: US 12,105,058 B2
(45) Date of Patent: Oct. 1, 2024

(54) METHOD AND SYSTEM FOR DETERMINING ACOUSTIC EMISSION (AE) PARAMETERS OF ROCK BASED ON MOMENT TENSOR ANALYSIS

(71) Applicant: INSTITUTE OF GEOLOGY AND GEOPHYSICS, CHINESE ACADEMY OF SCIENCES, Beijing (CN)

(72) Inventors: Lei Xue, Beijing (CN); Mengyang Zhai, Beijing (CN); Fengchang Bu, Beijing (CN); Xiaolin Huang, Beijing (CN); Ke Zhang, Beijing (CN); Chao Xu, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 448 days.

(21) Appl. No.: 17/655,413

(22) Filed: Mar. 18, 2022

(65) Prior Publication Data
US 2023/0123452 A1    Apr. 20, 2023

(30) Foreign Application Priority Data
Oct. 18, 2021   (CN) .......................... 202111206685.1

(51) Int. Cl.
*G01N 3/06*    (2006.01)
*G01N 3/08*    (2006.01)
*G01N 3/60*    (2006.01)

(52) U.S. Cl.
CPC ............... *G01N 3/068* (2013.01); *G01N 3/08* (2013.01); *G01N 3/60* (2013.01)

(58) Field of Classification Search
USPC ........................................................ 73/800
See application file for complete search history.

(56) References Cited

PUBLICATIONS

Zhai et al., Effects of shear rates on the damaging behaviors of layered rocks subjected to direct shear: Insights from acoustic emission characteristics, Engineering Fracture Mechanics, vol. 258, pp. 108046-1-24 (Year: 2021).*

(Continued)

*Primary Examiner* — Nathaniel T Woodward
(74) *Attorney, Agent, or Firm* — Shumaker, Loop & Kendrick, LLP; James D. Miller

(57) ABSTRACT

A method and system for determining acoustic emission (AE) parameters of rock based on moment tensor analysis. The method includes: constructing, according to macroscopic mechanical parameters, a numerical model of a rock specimen to be tested; loading the numerical model through particle flow code software to simulate a failure process of the rock specimen to be tested, and identifying fracturing time and positions of microcracks when the PFC software loads the numerical model; determining, when the PFC software loads the numerical model, if rock grains of two sequentially generated microcracks include common rock grains, and an interval for generating the two microcracks is less than duration time of a present AE event, the two microcracks as a same AE event; taking geometric centers of all microcracks within a spatial range of an AE event as source positions of the corresponding AE event; and determining AE parameters of the AE event.

10 Claims, 5 Drawing Sheets

(56) References Cited

PUBLICATIONS

Effects of shear rates on the damaging behaviors of layered rocks subjected to direct shear: Insights from acoustic emission characteristics; Mengyang Zhai, Lei Xue, Hongran Chen, Chao Xu, Yan Cui; 24 pages; www.elsevier.com/locate/engfracmech; Accepted Oct. 7, 2021.

Particles Flow Analysis of Acoustic Emission Characteristics During Rock Failure Process; Zhou Yu, Wu Chunchuan, Xu Xueliang, Sun Wei, Zhang Xiaoping; vol. 32., No. 5, May 2013, Chinese Journal of Rock Mechanics and Engineering, 9 pages.

\* cited by examiner

METHOD AND SYSTEM FOR DETERMINING ACOUSTIC EMISSION (AE) PARAMETERS OF ROCK BASED ON MOMENT TENSOR ANALYSIS

CROSS REFERENCE TO RELATED APPLICATION

This patent application claims the benefit and priority of Chinese Patent Application No. 202111206685.1, filed on Oct. 18, 2021, the disclosure of which is incorporated by reference herein in its entirety as part of the present application.

TECHNICAL FIELD

The present disclosure relates to the technical field of acoustic emission (AE) monitoring, and in particular, to a method and system for determining AE parameters of rock based on moment tensor analysis.

BACKGROUND ART

Rock is a typical heterogeneous material, with progressive deformation and failure. Understanding the progressive failure process of the rock is of great significance to many projects. However, the progressive damages of rock materials arising from initiation, propagation and coalescence of microcracks cannot be observed and quantized directly by scholars and engineers without other means. AE monitoring as a non-destructive monitoring technology has been widely applied to the fields of rock mechanics and rock engineering. The term AE refers to the generation of elastic waves due to release of strain energy from the rock in fracturing process. With further analysis on these elastic waves, various AE parameters such as AE count, AE energy and b value can be obtained to quantize the rock damage degrees, capture the rock instability precursors, and so on.

In view of defects of indoor AE experiments, numerical simulation methods for reproducing AE phenomena of the rock have been proved as a powerful approach to research the progressive fracturing process of the rock. Among various numerical simulation methods, particle flow code (PFC) has become one of mainstream software in the field of rock mechanics, because it can reproduce the initiation, propagation and coalescence of microcracks in the progressive fracturing process of the rock through a bonded-particle model (BPM), and can directly simulate large deformations of the rock materials. In the BPM, rock grains are simulated with non-uniform-sized circular stiff particles, and adhesive bonding behaviors between the rock grains are simulated with bonded contacts. Given that the bonded contacts have certain stiffnesses and strengths, motions of the particles meet the Newton's second law, and the force and moment on each bonded contact are updated with the motions of the particles, the microcracks are generated when the contact force exceeds the contact strength. With continuation of the loading, the microcracks are initiated and gathered and eventually the model is damaged.

In natural seismic and microseismic monitoring, when dynamic waves released from seismic sources are recorded, information of the seismic sources is often obtained by means of moment tensor inversion. In PFC simulation, the moment tensors can be obtained by recording variations of surrounding contact forces in bond failure, thus getting the magnitude and energy of the AE. The moment tensor analysis is unavailable to determine source positions and numbers of microcracks in single AE events at present.

SUMMARY

An objective of the present disclosure is to provide a method and system for determining AE parameters of rock based on moment tensor analysis. The present disclosure can determine source positions and AE parameters of AE events.

To implement the above objectives, the present disclosure provides the following solutions.

A method for determining AE parameters of rock based on moment tensor analysis includes:
  acquiring macroscopic mechanical parameters of a rock specimen to be tested;
  constructing, according to the macroscopic mechanical parameters, a numerical model of the rock specimen to be tested, the numerical model including multiple rock grains that are bonded by an adhesive;
  loading the numerical model through PFC software to simulate a failure process of the rock specimen to be tested, and identifying fracturing time and positions of microcracks when the PFC software loads the numerical model, where when the PFC software loads the numerical model, fractures of bonded points between the rock grains respectively represent the microcracks;
  determining, when the PFC software loads the numerical model, if rock grains of two sequentially generated microcracks include common rock grains, and an interval for generating the two microcracks is less than duration time of a present AE event, the two microcracks as a same AE event, where initial duration time of the present AE event is duration time generating a first microcrack in the present AE event, the duration time generating the microcrack is propagation time of the crack in a rock grain having a greater diameter in two rock grains generating the microcrack, and a propagation velocity of the crack is a half of a shear wave velocity of the rock specimen to be tested;
  taking a spatial range covered by all microcracks corresponding to an AE event as a spatial range of the corresponding AE event, and taking geometric centers of all microcracks within the spatial range of the AE event as source positions of the corresponding AE event; and determining AE parameters of the AE event according to moment tensor analysis.

Optionally, the determining AE parameters of the AE event according to moment tensor analysis may specifically include:
  respectively determining, when the PFC software loads the numerical model, after an initial microcrack is generated, components of a moment tensor of the microcrack in preset time steps according to a variation of a contact force between rock grains of the generated microcrack as well as a contact position;
  determining a scalar moment of the microcrack according to the components of the moment tensor of the microcrack;
  taking a value of a maximum scalar moment in all microcracks within the range of the AE event as a scalar moment of the corresponding AE event; and
  determining the AE parameters of the AE event according to the scalar moment of the AE event.

Optionally, the determining the AE parameters of the AE event according to the scalar moment of the AE event may specifically include:

determining a magnitude of the AE event according to the scalar moment of the AE event; and determining energy of the AE event according to the magnitude of the AE event.

Optionally, the macroscopic mechanical parameters may include a uniaxial compressive strength, an elastic modulus, a Poisson's ratio and a shear wave velocity.

Optionally, the constructing, according to the macroscopic mechanical parameters, a numerical model of the rock specimen to be tested may specifically include:

constructing, based on the PFC software, the numerical model of the rock specimen to be tested; and calibrating microscopic parameters for the rock grains and contacts between the rock grains in the numerical model with a trial-and-error method according to the macroscopic mechanical parameters.

The present disclosure further provides a system for determining AE parameters of rock based on moment tensor analysis, including:

a macroscopic mechanical parameter acquisition module, configured to acquire macroscopic mechanical parameters of a rock specimen to be tested;

a numerical model construction module, configured to construct, according to the macroscopic mechanical parameters, a numerical model of the rock specimen to be tested, the numerical model including multiple rock grains that are bonded by an adhesive;

a microcrack fracturing time and position determination module, configured to load the numerical model through PFC software to simulate a failure process of the rock specimen to be tested, and identify fracturing time and positions of microcracks when the PFC software loads the numerical model, where when the PFC software loads the numerical model, fractures of bonded points between the rock grains respectively represent the microcracks;

a same AE event determination module, configured to determine, when the PFC software loads the numerical model, if rock grains of two sequentially generated microcracks include common rock grains, and an interval for generating the two microcracks is less than duration time of a present AE event, the two microcracks as a same AE event, where initial duration time of the present AE event is duration time generating a first microcrack in the present AE event, the duration time generating the microcrack is propagation time of the crack in a rock grain having a greater diameter in two rock grains generating the microcrack, and a propagation velocity of the crack is a half of a shear wave velocity of the rock specimen to be tested;

a spatial range and source position determination module, configured to take a spatial range covered by all microcracks corresponding to an AE event as a spatial range of the corresponding AE event, and take geometric centers of all microcracks within the spatial range of the AE event as source positions of the corresponding AE event; and an AE parameter determination module, configured to determine AE parameters of the AE event according to moment tensor analysis.

Optionally, the AE parameter determination module may specifically include:

a unit for determining components of a moment tensor of a microcrack, configured to respectively determine, when the PFC software loads the numerical model, after an initial microcrack is generated, components of a moment tensor of the microcrack in preset time steps according to a variation of a contact force between rock grains of the generated microcrack as well as a contact position;

a unit for determining a scalar moment of the microcrack, configured to determine a scalar moment of the microcrack according to the components of the moment tensor of the microcrack;

a unit for determining a scalar moment of the AE event, configured to take a value of a maximum scalar moment in all microcracks within the range of the AE event as a scalar moment of the corresponding AE event; and an AE parameter determination unit, configured to determine the AE parameters of the AE event according to the scalar moment of the AE event.

Optionally, the AE parameter determination unit may specifically include:

a magnitude determination subunit, configured to determine a magnitude of the AE event according to the scalar moment of the AE event; and an energy determination subunit, configured to determine energy of the AE event according to the magnitude of the corresponding AE event.

Optionally, the macroscopic mechanical parameters may include a uniaxial compressive strength, an elastic modulus, a Poisson's ratio and a shear wave velocity.

Optionally, the numerical model construction module may specifically include:

a numerical model construction unit, configured to construct, based on the PFC software, the numerical model of the rock specimen to be tested; and a calibration unit, configured to calibrate microscopic parameters for the rock grains and contacts between the rock grains in the numerical model with a trial-and-error method according to the macroscopic mechanical parameters.

Based on specific embodiments provided in the present disclosure, the present disclosure has the following technical effects:

The present disclosure constructs, according to macroscopic mechanical parameters, a numerical model of a rock specimen to be tested, simulates a failure process of the numerical model through PFC software, and determines microcracks having similar generation time and generation positions in a loading process as a same AE event, thereby determining AE source positions, and calculating AE parameters of AE events through moment tensor analysis.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. Based on the embodiments of the present disclosure, all other embodiments obtained by the person of ordinary skill in the art without creative efforts shall fall within the protection scope of the present disclosure.

An objective of the present disclosure is to provide a method and system for determining AE parameters of rock based on moment tensor analysis. The present disclosure can determine source positions and AE parameters of AE events.

To make the foregoing objective, features, and advantages of the present disclosure clearer and more comprehensible, the present disclosure will be further described in detail below with reference to the accompanying drawings and specific embodiments.

Figure 1:
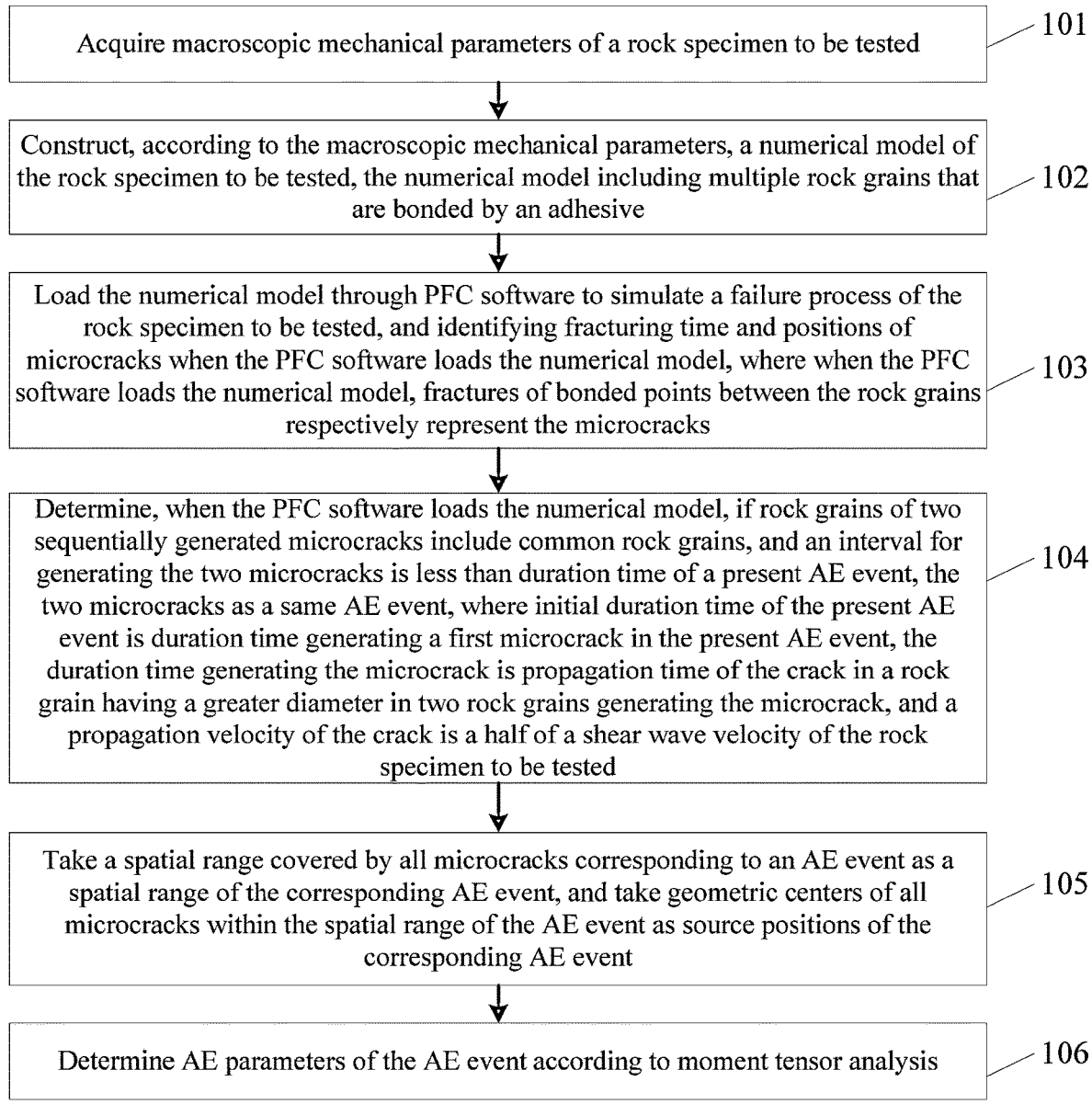
FIG. 1 illustrates a flow chart of a method for determining AE parameters of rock based on moment tensor analysis according to the present disclosure.

FIG. 1 illustrates a flow chart of a method for determining AE parameters of rock based on moment tensor analysis according to the present disclosure. As shown in FIG. 1, the method for determining AE parameters of rock based on moment tensor analysis includes the following steps:

Step 101: Macroscopic mechanical parameters of a rock specimen to be tested are acquired.

The macroscopic mechanical parameters include a uniaxial compressive strength, an elastic modulus, a Poisson's ratio and a shear wave velocity. The macroscopic mechanical parameters of the rock specimen to be tested are specifically acquired with indoor tests.

Step 102: A numerical model of the rock specimen to be tested is constructed according to the macroscopic mechanical parameters, the numerical model including multiple rock grains that are bonded by an adhesive.

Step 102 specifically includes:

The numerical model of the rock specimen to be tested is constructed based on a PFC software.

Microscopic parameters for the rock grains and contacts between the rock grains in the numerical model are calibrated with a trial-and-error method according to the macroscopic mechanical parameters.

Figure 2:
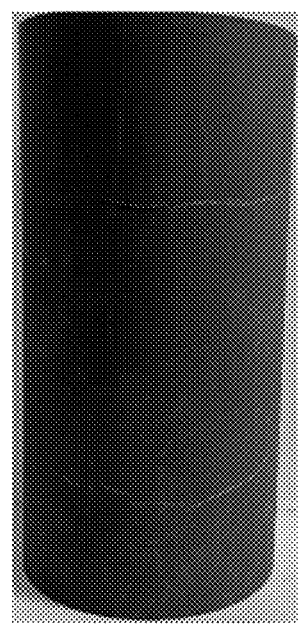
FIG. 2 illustrates a rock specimen according to the present disclosure.
Figure 3:
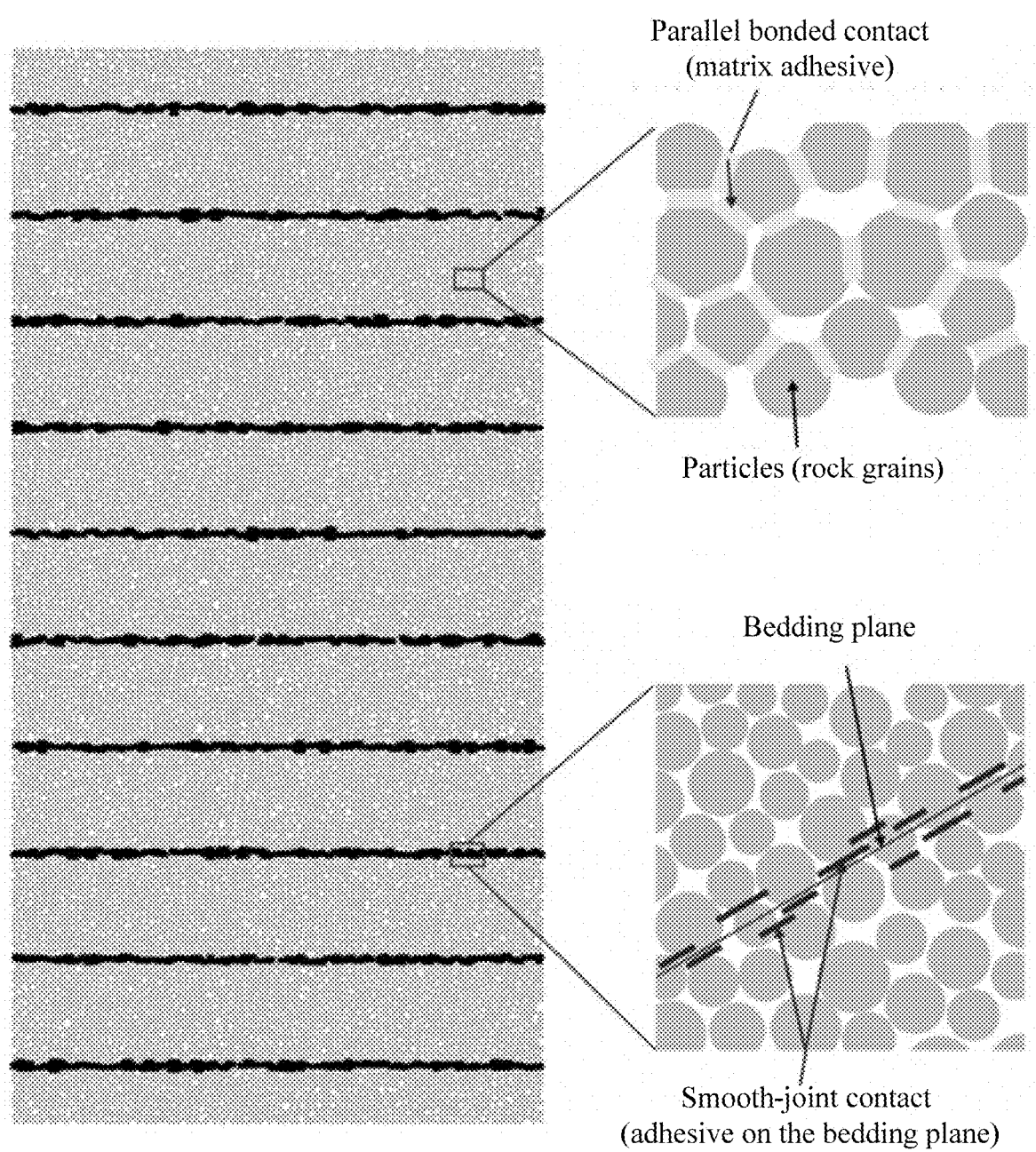
FIG. 3 illustrates a numerical model according to the present disclosure.
Figure 4:
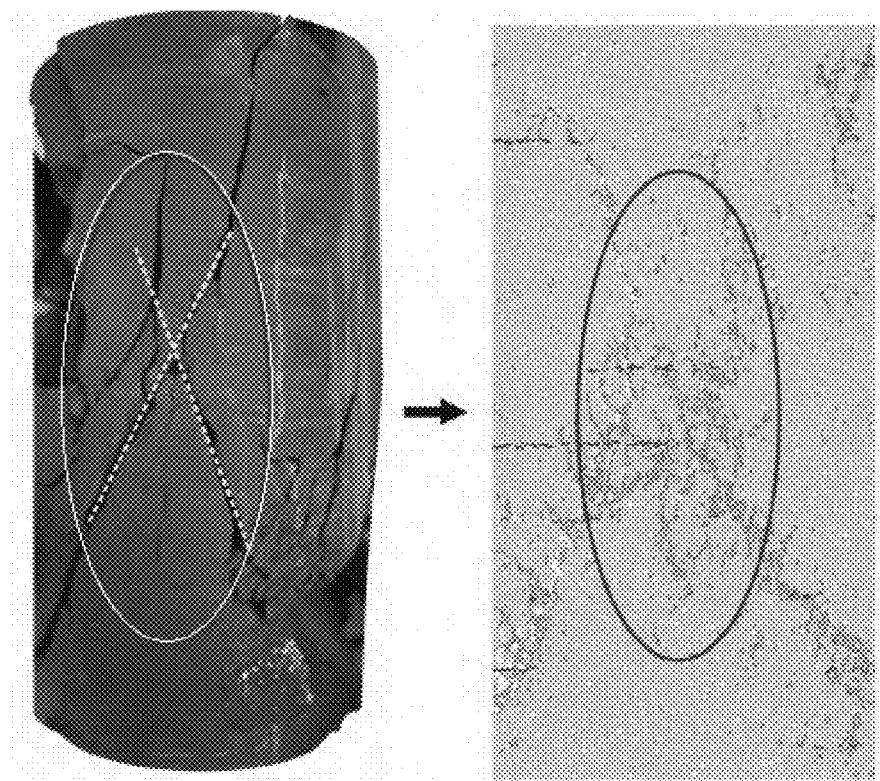
FIG. 4 illustrates a comparison between a rock specimen and a numerical model in fracture according to the present disclosure.
Figure 5:
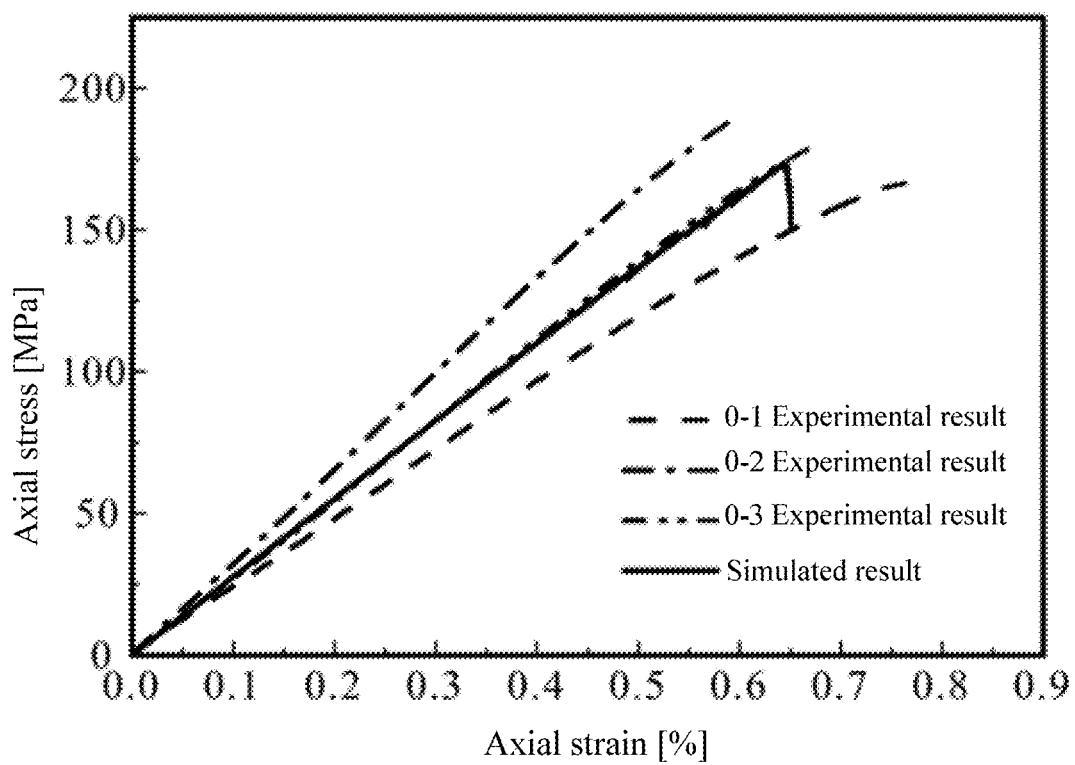
FIG. 5 illustrates a comparison between a rock specimen and a numerical model in stress-strain curve according to the present disclosure.

With shale as a specific embodiment, the numerical model of the rock specimen is constructed based on the PFC. The rock specimen is as shown in FIG. 2, while the numerical model of the rock specimen is as shown in FIG. 3. Microscopic parameters (as shown in Table 1 and Table 2) for the particles and contacts thereof in the numerical model are calibrated with the trial-and-error method according to the macroscopic mechanical parameters of the rock specimen, to reproduce macroscopic mechanical response characteristics of the rock specimen, as shown in FIG. 4 and FIG. 5.

The contacts refer to contacts between the particles, namely adhesives for bonding the rock grains.

TABLE 1

Microscopic parameters for rock grains and contacts thereof

| Microscopic parameters of particles | Value | Microscopic parameters of contacts | Value |
|---|---|---|---|
| Density [kg/m³] | 3,000 | Bond elastic modulus [GPa] | 22 |
| Elastic modulus [GPa] | 22 | Bond stiffness ratio | 1.5 |
| Stiffness ratio | 1.5 | Contact tensile strength [MPa] | 170 |
| Coefficient of friction | 0.8 | Contact cohesion [MPa] | 150 |
| Damping coefficient | 0.7 | Contact angle of internal friction [°] | 40 |

TABLE 2

Microscopic parameters for bedding plane of the rock

| Normal stiffness [GPa/m] | Tangential stiffness [GPa/m] | Coefficient of friction | Tensile strength [MPa] | Cohesion [MPa] | Joint friction angle [degree] |
|---|---|---|---|---|---|
| 10,000 | 3,700 | 20 | 30 | 80 | 40 |

FIG. 5 shows three parallel experiments, in which 0-1, 0-2 and 0-3 represent stress-strain curves of different shale samples under same conditions, respectively. With the three parallel experiments, data on the stress-strain curve of the shale specimen is determined to reduce errors for acquiring the parameters.

Step 103: The numerical model is loaded through PFC software to simulate a failure process of the rock specimen to be tested, and fracturing time and positions of microcracks are identified when the PFC software loads the numerical model, where when the PFC software loads the numerical model, fractures of bonded points between the rock grains respectively represent the microcracks.

Step 103 specifically includes: A program is written based on a built-in fish language in the PFC software; by taking fractures of bonded contacts in a loading process of the numerical model as generation of microcracks at one time, the microcracks generated in the loading process of the numerical model of the rock are identified, and fracturing time and positions of the microcracks are recorded. The generated microcracks are as shown in FIG. 4. In FIG. 4, the left illustrates the real fractures of the rock specimen, and the right illustrates the fractures of the numerical model.

When the stress on the bonded contact exceeds the corresponding strength, the contact is fractured to form the microcrack. In this case, operation time of the model, namely the time generating the microcrack (fracturing time), can be recorded with a built-in function mech.age in the PFC software.

Step 104: When the PFC software loads the numerical model, if rock grains of two sequentially generated microcracks include common rock grains, and an interval for generating the two microcracks is less than duration time of a present AE event, the two microcracks are determined as a same AE event, where initial duration time of the present AE event is duration time generating a first microcrack in the present AE event, the duration time generating the microcrack is propagation time of the crack in a rock grain having a greater diameter in two rock grains generating the microcrack, and a propagation velocity of the crack is a half of a shear wave velocity of the rock specimen to be tested.

Step 104 specifically includes: When the PFC software loads the numerical model, whether the rock grains of the two sequentially generated microcracks include the common rock grains and whether the interval for generating the two microcracks is less than the duration time of the present AE event are determined; and if the rock grains of the two sequentially generated microcracks include the common rock grains, and the interval for generating the two microcracks is less than the duration time of the present AE event, the two microcracks are determined as the same AE event, where the initial duration time of the present AE event is the duration time generating the first microcrack in the present AE event, the duration time generating the microcrack is the propagation time of the crack in the rock grain having the greater diameter in the two rock grains generating the microcracks, and the propagation velocity of the crack is the half of the shear wave velocity of the rock specimen to be tested.

If the rock grains of the two sequentially generated microcracks do not include the common rock grains, or the interval for generating the two microcracks is greater than or equal to the duration time of the present AE event, the two microcracks are not determined as the same AE event, and the two microcracks are determined as different AE events by taking a microcrack lately generated in the two microcracks as an initial microcrack of a new AE event.

The principle for determining the same AE event is established based on fracturing time and positions of the microcracks. The microcracks having similar fracturing time and fracture positions are determined as the same AE event.

Step 105: A spatial range covered by all microcracks corresponding to an AE event is taken as a spatial range of the corresponding AE event, and geometric centers of all microcracks within the spatial range of the AE event are determined as source positions of the corresponding AE event.

Steps 104-105 specifically include: 1) The duration time of the AE event is determined according to a relationship between the propagation velocity of the microcrack and the shear wave velocity of the rock material. Given that the propagation velocity of the microcrack is a half of the shear wave velocity of the rock material, the duration time $t_d$ of the AE event can be determined. 2) The particle generating the initial microcrack is defined as a "trigger particle" (S1 in FIG. 6 indicates the large particle generating the crack), and the surrounding bonded contacts thereof (S2 in FIG. 6 indicates the small bonded contacts around the large particle) are defined as "affected contacts". Within the duration time $t_d$ of the AE event, if any "affected contact" is fractured to generate a new microcrack, the microcrack being one part in the same AE event, and the particle generating the microcrack serves as a new "trigger particle", the AE duration time is recalculated, and the $t_d$ is updated with the recalculated AE duration time. 3) When the "affected contacts" are not fractured within the duration time $t_d$ of the AE event, it is considered that the AE event is ended. 4) Geometric centers of all microcracks included in the AE event are taken as AE source positions.

Figure 6:
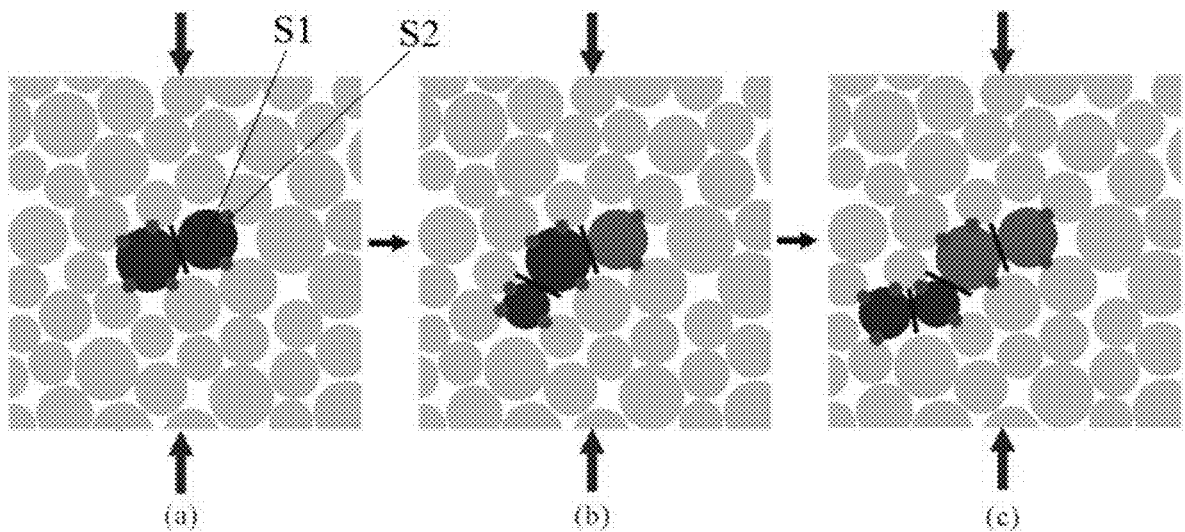
FIG. 6 illustrates an evolution of an AE event according to the present disclosure.

FIG. 6 illustrates an evolution of an AE event. In FIG. 6, the AE event includes three microcracks. Specifically, (a) in FIG. 6 corresponds to the time $t_1$, (b) in FIG. 6 corresponds to the time $t_2$, (c) in FIG. 6 corresponds to the time $t_3$, $t_2-t_1 < t_d$ and $t_3-t_2 < t_d$ ($t_d$ is the AE duration time which is updated with the increase of the microcracks).

Step 106: AE parameters of the AE event are determined according to moment tensor analysis.

The AE parameters include a magnitude and energy.

Step 106 specifically includes:

When the PFC software loads the numerical model, after an initial microcrack is generated, components of a moment tensor of the microcrack are respectively determined in preset time steps according to a variation of a contact force between rock grains of the generated microcracks as well as a contact position.

$$M_{ij} = \Sigma \Delta F_i R_j \quad (1)$$

In the foregoing Eq., $M_{ij}$ represents each of components of the moment tensor, $\Delta F_i$ is an ith component of the variation of the contact force, $R_j$ is a jth component between the contact position and a center of the AE event, where in the mathematical meaning, the contact position and the center of the AE event respectively represent two points, and a distance between the two points is calculated, and $R_j$ represents a jth component of the distance between the two points, the size of contact force and the contact position being acquired through the built-in fish language.

The size of the contact force may be acquired through the built-in function contact.force.global in the PFC, and the contact position may be acquired through the built-in function contact.pos in the PFC.

A scalar moment of the microcrack is determined according to the components of the moment tensor of the microcrack.

The components of the moment tensor of the AE event can be calculated in each time step according to Eq. (1) upon the generation of the initial microcrack, thus determining the scalar moment as:

$$M_0 = \left( \frac{\sum_{j=1}^{3} m_j^2}{2} \right)^{\frac{1}{2}} \quad (2)$$

In the Eq., $m_j$ is a jth feature value of the moment tensor $M_{ij}$, and $M_0$ represents the scalar moment. Considering that the moment tensor and scalar moment recorded in each time step consume the memory, the value of the maximum scalar moment in the AE event is generally used as the actual value, and the time generating the value is the occurrence time of the AE event.

A value of a maximum scalar moment in all microcracks within the range of the AE event is taken as a scalar moment of the corresponding AE event, occurrence time of a microcrack corresponding to the maximum scalar moment being occurrence time of the AE event.

The AE parameters of the AE event are determined according to the scalar moment of the AE event.

The step that the AE parameters of the AE event are determined according to the scalar moment of the AE event specifically includes:

A magnitude of the AE event is determined according to the scalar moment of the AE event.

The magnitude of the AE event is given by:

$$M_w = \frac{2}{3} \log M_0 - 6 \quad (3)$$

Energy of the AE event is determined according to the magnitude of the AE event:

$$lgE = 1.5 M_w + 4.8 \quad (4)$$

In the foregoing Eqs., $M_W$ represents the magnitude, and E represents the AE energy, with the unit being the joule.

Figure 7:
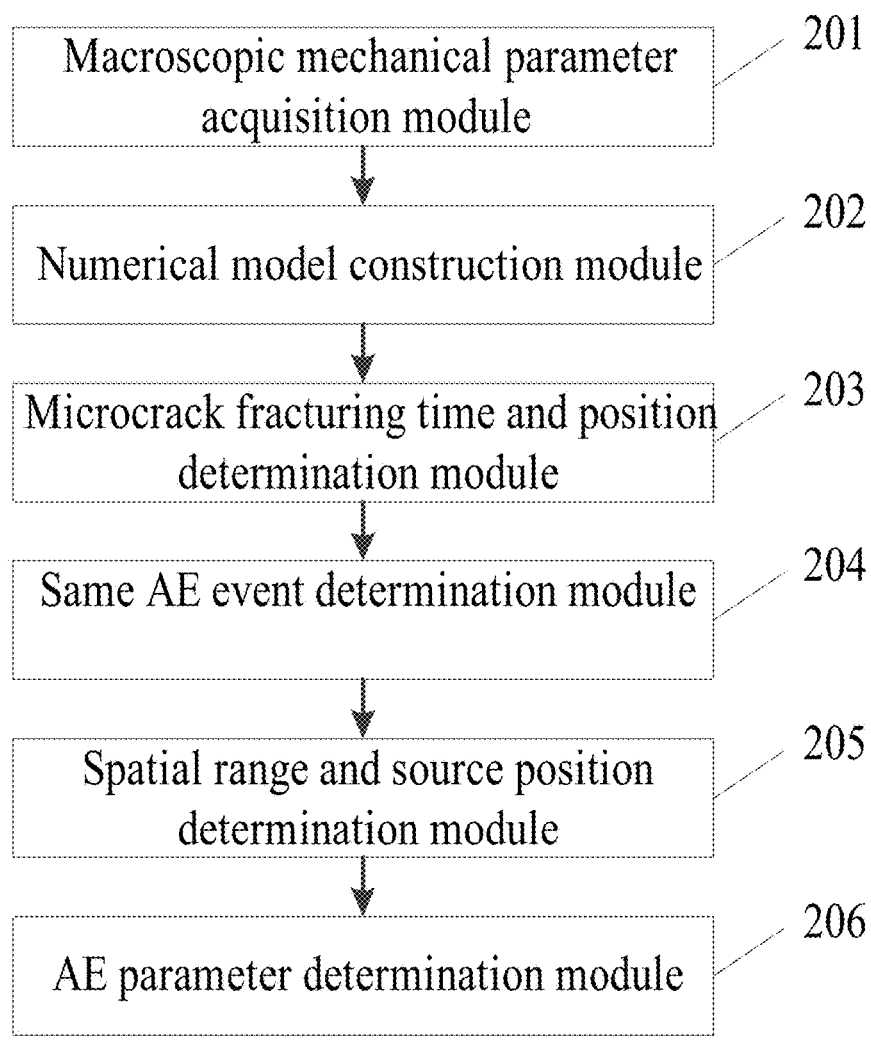
FIG. 7 illustrates a structure of a system for determining AE parameters of rock based on moment tensor analysis according to the present disclosure.

FIG. 7 illustrates a structure of a system for determining AE parameters of rock based on moment tensor analysis according to the present disclosure. As shown in FIG. 7, the system for determining AE parameters of rock based on moment tensor analysis includes:

a macroscopic mechanical parameter acquisition module 201, configured to acquire macroscopic mechanical parameters of a rock specimen to be tested;

a numerical model construction module 202, configured to construct, according to the macroscopic mechanical parameters, a numerical model of the rock specimen to be tested, the numerical model including multiple rock grains that are bonded by an adhesive;

a microcrack fracturing time and position determination module 203, configured to identify fracturing time and positions of microcracks when PFC software loads the numerical model, where when the PFC software loads the numerical model, fractures of bonded points between the rock grains respectively represent the microcracks;

a same AE event determination module 204, configured to determine, when the PFC software loads the numerical model, if rock grains of two sequentially generated microcracks include common rock grains, and an interval for generating the two microcracks is less than duration time of a present AE event, the two microcracks as a same AE event, where initial duration time of the present AE event is duration time generating a first microcrack in the present AE event, the duration time generating the microcrack is propagation time of the crack in a rock grain having a greater diameter in two rock grains generating the microcrack, and a propagation velocity of the crack is a half of a shear wave velocity of the rock specimen to be tested;

a spatial range and source position determination module 205, configured to take a spatial range covered by all microcracks corresponding to an AE event as a spatial range of the corresponding AE event, and take geometric centers of all microcracks within the spatial range of the AE event as source positions of the corresponding AE event; and an AE parameter determination module 206, configured to determine AE parameters of the AE event according to moment tensor analysis.

The AE parameter determination module 206 specifically includes:

a unit for determining components of a moment tensor of a microcrack, configured to respectively determine, when the PFC software loads the numerical model, after an initial microcrack is generated, components of a moment tensor of the microcrack in preset time steps according to a variation of a contact force between rock grains of the generated microcrack as well as a contact position;

a unit for determining a scalar moment of the microcrack, configured to determine a scalar moment of the microcrack according to the components of the moment tensor of the microcrack;

a unit for determining a scalar moment of the AE event, configured to take a value of a maximum scalar moment in all microcracks within the range of the AE event as a scalar moment of the corresponding AE event; and an AE parameter determination unit, configured to determine the AE parameters of the AE event according to the scalar moment of the AE event.

The AE parameter determination unit specifically includes:

a magnitude determination subunit, configured to determine a magnitude of the AE event according to the scalar moment of the AE event; and an energy determination subunit, configured to determine energy of the AE event according to the magnitude of the corresponding AE event.

The macroscopic mechanical parameters include a uniaxial compressive strength, an elastic modulus, a Poisson's ratio and a shear wave velocity.

The numerical model construction module 202 specifically includes:

a numerical model construction unit, configured to construct, based on the PFC software, the numerical model of the rock specimen to be tested; and a calibration unit, configured to calibrate microscopic parameters for the rock grains and contacts between the rock grains in the numerical model with a trial-and-error method according to the macroscopic mechanical parameters.

Each embodiment of this specification is described in a progressive manner, each embodiment focuses on the difference from other embodiments, and the same and similar parts between the embodiments may refer to each other. The system disclosed in the embodiments corresponds to the method disclosed in the embodiments. Therefore, the system is described in a relatively simple manner. For the related parts, reference may be made to the description of the method parts.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A method for determining acoustic emission (AE) parameters of rock based on moment tensor analysis, comprising:

acquiring macroscopic mechanical parameters of a rock specimen to be tested;

constructing, according to the macroscopic mechanical parameters, a numerical model of the rock specimen to be tested, the numerical model comprising multiple rock grains that are bonded by an adhesive;

loading the numerical model through particle flow code (PFC) software to simulate a failure process of the rock specimen to be tested, and identifying fracturing time and positions of microcracks when the PFC software loads the numerical model, wherein when the PFC software loads the numerical model, fractures of bonded points between the rock grains respectively represent the microcracks;

determining, when the PFC software loads the numerical model, if rock grains of two sequentially generated microcracks comprise common rock grains, and an interval for generating the two microcracks is less than duration time of a present AE event, the two microcracks as a same AE event, wherein initial duration time of the present AE event is duration time generating a first microcrack in the present AE event, the duration time generating the first microcrack is propagation time of the microcrack in a rock grain having a greater diameter in two rock grains generating the microcrack, and a propagation velocity of the microcrack is a half of a shear wave velocity of the rock specimen to be tested;

taking a spatial range covered by all microcracks corresponding to an AE event as a spatial range of the corresponding AE event, and taking geometric centers of all microcracks within the spatial range of the AE event as source positions of the corresponding AE event; and determining AE parameters of the AE event according to moment tensor analysis.

2. The method for determining AE parameters of rock based on moment tensor analysis according to claim 1, wherein the determining AE parameters of the AE event according to moment tensor analysis further comprises:

respectively determining, when the PFC software loads the numerical model, after an initial microcrack is generated, components of a moment tensor of the microcrack in preset time steps according to a variation of a contact force between rock grains of the generated microcrack as well as a contact position;

determining a scalar moment of the microcrack according to the components of the moment tensor of the microcrack;

taking a value of a maximum scalar moment in all microcracks within the range of the AE event as a scalar moment of the corresponding AE event; and determining the AE parameters of the AE event according to the scalar moment of the AE event.

3. The method for determining AE parameters of rock based on moment tensor analysis according to claim 2, wherein the determining the AE parameters of the AE event according to the scalar moment of the AE event further comprises:

determining a magnitude of the AE event according to the scalar moment of the AE event; and determining energy of the AE event according to the magnitude of the AE event.

4. The method for determining AE parameters of rock based on moment tensor analysis according to claim 1, wherein the macroscopic mechanical parameters comprise a uniaxial compressive strength, an elastic modulus, a Poisson's ratio and a shear wave velocity.

5. The method for determining AE parameters of rock based on moment tensor analysis according to claim 1, wherein the constructing, according to the macroscopic mechanical parameters, a numerical model of the rock specimen to be tested further comprises:

constructing, based on the PFC software, the numerical model of the rock specimen to be tested; and calibrating microscopic parameters for the rock grains and contacts between the rock grains in the numerical model with a trial-and-error method according to the macroscopic mechanical parameters.

6. A system for determining acoustic emission (AE) parameters of rock based on moment tensor analysis, comprising:

a macroscopic mechanical parameter acquisition module, configured to acquire macroscopic mechanical parameters of a rock specimen to be tested;

a numerical model construction module, configured to construct, according to the macroscopic mechanical parameters, a numerical model of the rock specimen to be tested, the numerical model comprising multiple rock grains that are bonded by an adhesive;

a microcrack fracturing time and position determination module, configured to identify fracturing time and positions of microcracks when particle flow code (PFC) software loads the numerical model, wherein when the PFC software loads the numerical model, fractures of bonded points between the rock grains respectively represent the microcracks;

a same AE event determination module, configured to determine, when the PFC software loads the numerical model, if rock grains of two sequentially generated microcracks comprise common rock grains, and an interval for generating the two microcracks is less than duration time of a present AE event, the two microcracks as a same AE event, wherein initial duration time of the present AE event is duration time generating a first microcrack in the present AE event, the duration time generating the first microcrack is propagation time of the microcrack in a rock grain having a greater diameter in two rock grains generating the microcrack, and a propagation velocity of the microcrack is a half of a shear wave velocity of the rock specimen to be tested;

a spatial range and source position determination module, configured to take a spatial range covered by all microcracks corresponding to an AE event as a spatial range of the corresponding AE event, and take geometric centers of all microcracks within the spatial range of the AE event as source positions of the corresponding AE event; and an AE parameter determination module, configured to determine AE parameters of the AE event according to moment tensor analysis.

7. The system for determining AE parameters of rock based on moment tensor analysis according to claim 6, wherein the AE parameter determination module further comprises:

a unit for determining components of a moment tensor of a microcrack, configured to respectively determine, when the PFC software loads the numerical model, after an initial microcrack is generated, components of a moment tensor of the microcrack in preset time steps according to a variation of a contact force between rock grains of the generated microcrack as well as a contact position;

a unit for determining a scalar moment of the microcrack, configured to determine a scalar moment of the microcrack according to the components of the moment tensor of the microcrack;

a unit for determining a scalar moment of the AE event, configured to take a value of a maximum scalar moment in all microcracks within the range of the AE event as a scalar moment of the corresponding AE event; and an AE parameter determination unit, configured to determine the AE parameters of the AE event according to the scalar moment of the AE event.

8. The system for determining AE parameters of rock based on moment tensor analysis according to claim 7, wherein the AE parameter determination unit further comprises:

a magnitude determination subunit, configured to determine a magnitude of the AE event according to the scalar moment of the AE event; and an energy determination subunit, configured to determine energy of the AE event according to the magnitude of the corresponding AE event.

9. The system for determining AE parameters of rock based on moment tensor analysis according to claim 6, wherein the macroscopic mechanical parameters comprise a uniaxial compressive strength, an elastic modulus, a Poisson's ratio and a shear wave velocity.

10. The system for determining AE parameters of rock based on moment tensor analysis according to claim 6, wherein the numerical model construction module further comprises:
- a numerical model construction unit, configured to construct, based on the PFC software, the numerical model of the rock specimen to be tested; and
- a calibration unit, configured to calibrate microscopic parameters for the rock grains and contacts between the rock grains in the numerical model with a trial-and-error method according to the macroscopic mechanical parameters.

\* \* \* \* \*